United States Patent

Mickler

[11] 3,714,623
[45] Jan. 30, 1973

[54] MEMORIZER

[75] Inventor: Brian E. Mickler, Houston, Tex.

[73] Assignee: Schlumberger Technology Corporation, New York, N.Y.

[22] Filed: June 8, 1971

[21] Appl. No.: 151,036

[52] U.S. Cl. ............... 340/18 R, 307/238, 328/55, 328/151, 340/18 DC, 340/173 CA, 346/33 WL
[51] Int. Cl. ...... G01v 1/32, H03k 5/159, G11c 11/24
[58] Field of Search ........ 340/18 R, 18 DC, 173 CA; 307/238; 328/151, 55

[56] References Cited

UNITED STATES PATENTS

| | | | |
|---|---|---|---|
| 3,434,105 | 3/1969 | Schwartz | 340/18 R |
| 3,172,043 | 3/1965 | Altman | 328/151 |
| 3,355,723 | 11/1967 | Clark | 307/238 |
| 3,191,158 | 6/1965 | Sherman | 340/173 CA |
| 3,157,859 | 11/1964 | Moore et al. | 340/173 CA |

Primary Examiner—Benjamin A. Borchelt
Assistant Examiner—H. A. Birmiel
Attorney—Arnold, White & Durkee, Tom Arnold, Robert A. White, Bill Durkee, Frank S. Vaden, Ernest R. Archambeau, Jr., Stewart F. Moore, David L. Moseley, Edward M. Roney and William R. Sherman

[57] ABSTRACT

A system is disclosed for individually storing dc voltage values of an applied continuous voltage sampled at controlled intervals, extracting the dc voltage samples at predetermined intervals later, and reconstructing a continuous voltage from the extracted voltages to produce a resultant continuous wave voltage that closely resembles the applied continuous wave voltage. The sampling time interval may be modified in accordance with variation of an independent time-related function, such as the time required to achieve a predetermined distance traversal. Continuous changes in the sampling time interval are automatically accommodated in the operation of the storing, extraction and reconstruction operations.

43 Claims, 7 Drawing Figures

Patented Jan. 30, 1973

Brian E. Mickler
INVENTOR

BY

Arnold, White & Durkee
ATTORNEYS

Brian E. Mickler
INVENTOR

BY

Arnold, White & Durkee
ATTORNEYS

MEMORIZER

BACKGROUND OF THE INVENTION

1. Field of the Invention

This invention relates to delay circuits and more particularly to circuits for converting an applied continuous signal to a discrete signal for controlled distance or depth delay and reconstructing the continuous signal from the delayed discrete signal.

2. Description of the Prior Art

In applications such as well logging, it is often desirable to align one or more developed data-carrying traces. Such traces may be developed, for example, from two or more types of logging means carried at longitudinally spaced stations within the same logging tool. The results may be compared and made more meaningful only if related in depth to each other. Moreover, logging traces are unavoidably developed at different rates of travel through the borehole from time to time, making uniform time delay of one developed signal trace to another less meaningful than when the traces are aligned with respect to the distance travelled and, hence, with respect to the earth formation traversed.

Prior art systems have utilized analog tape recorders for storing continuous voltages for later signal retrieval. The development of tape recordings requires the use of a motor to drive the recording instrument, such motor adding bulk and cumbersomeness to the surface apparatus. In addition, such a motor often introduces error in the recordings themselves. Furthermore, the signals developed by many types of logging means, such as induction logging means, are ultra low frequencies. Tape recordings lack the sensitivity to record such signal frequencies directly, requiring the use of carriers. The addition of carrier and modulator circuits not only increase the bulk of the apparatus, but even slight fluctuations of tape speed interfere with the modulation of low frequencies and causes a resultant error in the recorded signals.

One prior art system that has successfully overcome the shortcomings of analog tape recorders is described in U.S. Pat. No. 3,181,117, William J. Sloughter. The signal processing system there disclosed comprises a plurality of storage capacitors and a plurality of ganged rotary stepping switches, the rotatable arm of the switches each adapted to engage a succession of fixed contacts connected to respective ones of the storage capacitors. The arms of the stepping switches are advanced in synchronism with the travel of the borehole logging means via a measuring wheel linked with the cable from which the logging tool is suspended. The outputs from the stepping switches are weighted and combined following their respective staggered delays. The combined signal is then recorded.

Although the Sloughter system may be combined with conventional filtering means to minimize the effects of transients and to produce a continuous output, such a system is not readily capable of digital control. Particularly, the conventional low-pass filter is not capable of digital control in combination with the developed stepped voltages.

It is therefore a feature of the present invention to provide new and improved apparatus and method for delaying a continuous signal voltage using sampling techniques.

It is another feature of the present invention to provide an improved low pass filtering system the time constant therefor being susceptible to digital control.

It is yet another feature of the present invention to provide a spatial filter for reconstructing a continuous wave voltage from a dc stepped wave voltage having a regular time interval, the time interval being subject to modification in accordance with variation in distance traversal, the dynamic response characteristics of the spatial filter automatically changing to accommodate change in the time interval operation.

It is still another feature of the present invention to provide an improved technique for storing discrete quantities obtained from a continuous wave for reconstruction as a continuous wave at a delayed incremental distance interval through the use of individual switching elements (e.g., reed relays) suitable for digital control.

It is yet another feature of the present invention to provide an improved technique for deriving from a stepped dc voltage signal which is a step approximation of a continuous wave voltage, a continuous wave voltage which is shaped to closely resemble the original continuous wave voltage, the reconstruction technique permitting distance delay storage in a digital format.

SUMMARY OF THE INVENTION

A preferred embodiment of the present invention utilizes a spatial filter for developing a continuous voltage from an applied stepped dc voltage, the time period of the dc voltage steps varying in accordance with the rate of distance traversed. The spatial filter utilizes a plurality of selectable resistor components in a feedback control circuit which are responsively selected by logic means under the control of a device known as an intervalometer, that produces a pulse each time a fixed distance is travelled, regardless of how long that time is.

The input to the spatial filter may conveniently be developed by a delay switching circuit which receives a continuous voltage, such as is developed by a well-logging means. The delay switching circuit operation converts at regular sampling intervals the applied continuous voltage to a plurality of stored, individual, stepped-dc voltages. Extraction of the stored dc voltages is at a predetermined number of intervals later. When used together with the spatial filter, extraction control of the delay switching circuit and selection control of the resistor components of the feedback control circuit may be accomplished by the same intervalometer. Thus, the overall combination becomes a digitally controlled dynamic-time, fixed-distance memorizer circuit.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the Drawings

FIG. 5 is the pole plot in the S-plane of the frequency domain for the voltage transform function of the spatial filter shown in FIG. 4.

DESCRIPTION OF PREFERRED EMBODIMENTS

The purpose of the memorizer herein disclosed is to accept a continuous voltage signal of varying amplitude and produce it at a later time. The technique converts the continuous signal to discrete data, sometimes referred to as a step-voltage system, and reconstructs the step-voltage signal after a delay in time to closely simulate the applied continuous signals. Actually, the time delay over an extended period of time may undergo change from time to time. This permits signal delay and reconstruction of a location-associated signal to be related to distance travelled when the rate of travel is not uniform, but accelerates and decelerates. The memorizer presented herein, then, may be characterized as a "distance-delay" circuit.

Figure 1:
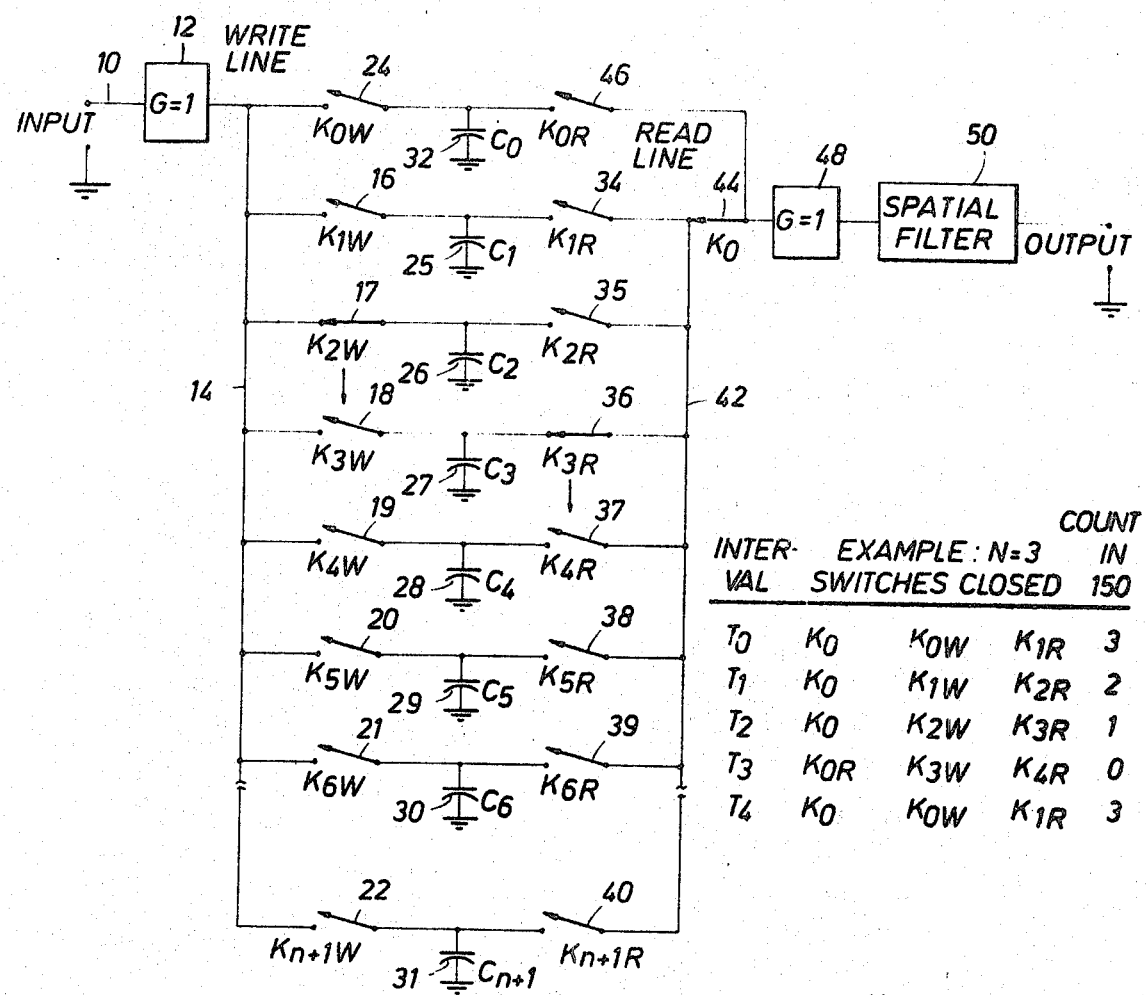
FIG. 1 is a partial block, partial schematic diagram of a delay switching circuit in combination with a spatial filter in accordance with a preferred embodiment of the present invention.

As used herein, the term memorizer includes both the switching circuit illustrated in FIG. 1 and its analog and digital equivalents and the spatial filter and its equivalents. For convenience, the switching circuit and its equivalents are referred to hereinafter as the "delay switching circuit."

As will be readily apparent, the spatial filter is capable of operating as a digitally controlled low-pass filter quite independently of the delay switching circuit, but in the application as a memorizer the control of two circuits may be coordinated to overall advantage by the same digital control network.

Now referring to the drawings and first FIG. 1, a network is shown for converting an applied continuous voltage signal to discrete data and delaying this data by a predetermined amount. Because this circuit includes a switching system operated by a means for producing pulses at a regular time interval, the so-called sampling interval, to be more fully explained hereinafter, it is essential that the data signal applied to the network have a maximum frequency less than $\frac{1}{2}T$, T being equal to the current period of the sampling interval.

Therefore, the continuous input voltage signal applied on line 10 undergoes prefiltering in low-pass filter and unity-gain amplifier 12. Filter and write amplifier 12, which may conveniently be referred to as a prefilter 12, exhibits an essentially flat response up to its cutoff frequency. Typically, when the input signals are spatially bandlimited, prefilter 12 may be a fixed low-pass filter selected to pass signals up to 5 Hz when T is expected to be from 0.1 to 4 seconds in duration. One application of the present invention is in the processing of logging signals. When low frequency type signals (e.g., resistivity, sonic) are derived, the spatial frequency of the input data signals is normally well within bounds so that fixed filtering before sampling to remove high frequency noise is sufficient. On the other hand, if the input signals are not spatially bandlimited, such as radioactivity-derived signals, prefilter 12 must be a spatial prefilter having a cutoff of $\omega_n = \frac{1}{2}T$ Hz for producing a meaningful output.

The output of filter 12 is connected to write line 14, in turn, connected to the input terminal of a plurality of separate single-pole, single-throw input memory-step switches 16–22. These switches may conveniently be reed relays for operation in the manner to be described. The number of input memory-step switches is selected to accomplish operation of the desired number of memory length steps. In a preferred construction, twenty input and twenty output switches are grouped together in a card module, multiple cards being used to expand the number of available memory length steps, as desired. For ease of discussion, these input-memory step switches 16–22 are labeled $K_1W$ through $K_{n+1}W$. The output of filter 12 is also connected to a terminal of single-pole, single-throw write line return switch 24, this switch being labeled $K_{0W}$. This switch may also conveniently be a reed relay.

The output terminal of each of memory-step switches 16–22 are respectively connected to a separate storage element, such as capacitors 25–31. For convenience, these capacitors are also labeled $C_1$ through $C_{n+1}$. Write line return switch 24 is similarly connected to storage capacitor 32, labeled $C_0$. Capacitors having essentially ideal resolution, sufficient accuracy and dynamic range for application in the present circuit are low leakage polycarbonate or teflon dielectric capacitors.

One terminal of a plurality of separate single-pole, single-throw, output memory-step switches 34–40 are also connected to storage capacitors 25–31, respectively. Like the input-memory-step switches, these switches may conveniently be reed relays. The other terminal of these output memory-step switches are joined together in read line 42.

Read line 42 is connected to one terminal of a single-pole, single-throw output switch 44, labeled $K_4$. The other terminal of switch 44 is connected to single-pole, single-throw switch 46, otherwise labeled $K_{0R}$. Like the other switches, these switches may conveniently be reed relays. The opposite terminal of switch 46 is connected to storage capacitor 32.

The output switch 44 is applied to another isolation, unity-gain amplifier 48 and the output from read amplifier 48 is applied to spatial filter 50.

Operation of switches 16–22, 24, 34–40, 44 and 48 is controlled by the outputs from a resettable shift register 52. This register is not illustrated as physically connected, but the output of each output stage is labeled with the switches it actuates via appropriate relay drivers (not shown). It will be noted in this particular embodiment that each of the outputs from register 52 operates two switches. For example, the first stage output from register 52 is operably connected to each $K_{0W}$ and $K_{1R}$, 1Rsecond stage output is connected to $K_{1W}$ and $K_{2R}$, the third stage output is connected to $K_{2W}$ and $K_{3R}$ and so forth. The final stage output is connected to $K_nW$ and $K_{n+1}R$. In each case of the input and output memory-step switches, an input memory-step switch is operably connected to the next subsequent output memory-step switch. $K_0$ switch 44 is normally closed throughout the register cycle, operating to open via logic inverter 57 only when the register is recycled.

The output of pulser 54 is connected as the input to register 52. For ease of discussing the delay switching circuit this pulser may be though of as merely a clock pulse generator. In many specific applications, this pulser is a network or system for producing pulses that relate time to distance in a manner to be hereinafter described, such as the output from an intervalometer.

Operationally, each of the input and output memory-step switches is a normally open switch, write return and read return switches 24 and 46 are normally open switches and output switch 44 is normally closed. For illustrative purposes, $K_{2W}$ switch 17 and its operating companion $K_{3R}$ switch 36 are shown closed. The next output from register 52 occurring following the output causing the operational step illustrated opens these switches and closes $K_{3W}$ switch 18 and $K_{4R}$ switch 37, as shown by the arrows between switches 17 and 18 and 36 and 37.

Memory length for the overall circuit is determined by the setting of how many successive stages of register 52 are allowed to produce outputs before there is a resetting of register 52. The example illustrated assumes a memory length of three steps. Three step operation may be accomplished by a convenient setting of the recycling of resettable shift register 52. At the same time register 52 is reset, $K_{0R}$ switch 46 is operated closed and normally closed $K_0$ switch 44 is opened via logic inverter 57 in accordance with the memory length selected, in this case, to operate with $K_{3W}$ switch 18. A preferred operation utilizes binary coded decimal counter 150 and all zero detector 152 for resetting register 52 and hence for operating these switches in a manner to be described hereinafter. Alternatively, any convenient connections may be made to synchronize operation of switches $K_{0R}$ and $K_0$ with register 52 and the input and output switches.

Figure 2:
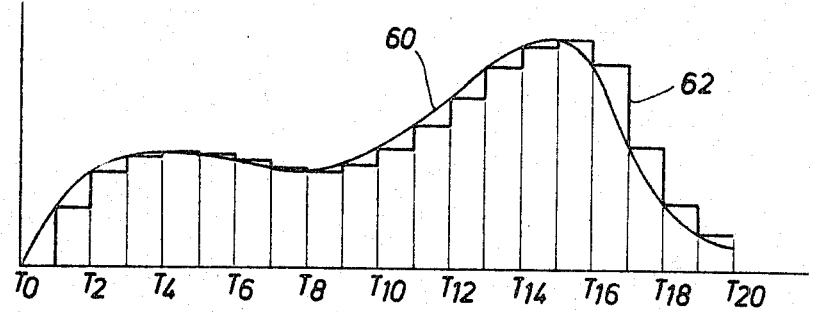
FIG. 2 is a graphical analysis of the sampling operation of the circuit shown in FIG. 1.
Figure 3:
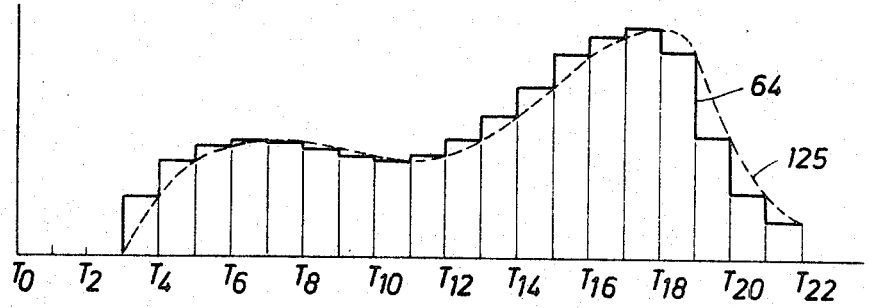
FIG. 3 is a graphical analysis of the voltage extracting operation of the circuit shown in FIG. 2.

In operation, and referring to FIGS. 1, 2 and 3, the first output at $T_0$ from resettable register 52, closes switch $K_{0W}$ and closes switch $K_{1R}$. Since nothing has been stored yet on capacitor $C_1$, there is no voltage applied to amplifier 48. However, voltage is allowed to build up on $C_0$ through $K_{0W}$ switch 24. The data on the write line is continuous, so it varies the charge on capacitor $C_0$ through $K_{0W}$ switch until that switch is opened at time $T_1$. On the occurrence of the second output at time $T_1$ from register 52, $K_{0W}$ switch is opened to establish the value stored on $C_0$. At the same time, $K_{1W}$ switch is closed to start the buildup on capacitor $C_1$. $K_{2R}$ switch is also closed, but again, since there is nothing yet stored on capacitor $C_2$, there is no output.

The third output at time $T_2$ from register 52 opens $K_{1W}$ switch to determine the stored charge on capacitor $C_1$. $K_{2W}$ switch is closed to initiate the charge buildup on capacitor $C_2$. $K_{3R}$ switch is closed, but since capacitor $C_3$ has no charge yet, there is no output.

The fourth output at time $T_3$ closes $K_{0R}$ switch 46 through switch 56, thereby allowing amplifier 48 to sense the voltage (charge) on capacitor $C_0$. At the same time, $K_{3W}$ switch 18 is closed, $K_{4R}$ switch 37 is closed and $K_0$ switch 44 is opened. It may be noted that whereby the voltage on capacitor $C_0$ was stored on the second output from register 52 (at the opening of switch $K_{0W}$) it is now sensed by amplifier 48 on the fourth pulse, thereby effecting a memory-length delay of two steps.

The fifth output from register 52 at time $T_4$ is effectively the same as the first. However, amplifier 48 now senses through the closure of switch $K_{1R}$ the magnitude of the voltage stored on capacitor $C_1$ at time $T_2$. Capacitor $C_0$ is also recharged with the value of the voltage at time $T_4$.

It may be seen that the example memory length table illustrated as part of FIG. 1 is valid for the above described operation.

If the occurrence of the first pulse from generator 54 is presumed to occur at time $T_0$, the second pulse at time $T_1$ and so forth, the continuous write line voltage 60, FIG. 2, may be seen to be effectively stored as step voltage 62, the steps occurring at the sampling interval T. FIG. 3 illustrates voltage 64 applied to amplifier 48, this voltage being delayed by two units of time from voltage 62.

It should be noted that "step voltage" as used herein indicates a dc voltage which may change in value at the end of each subsequent sampling interval. Of course, if there is no change in voltage value there will be no appearance of change, but the voltage is still a step voltage.

In actual practice, as will be described, there is a one-unit memory step delay effected by spatial filter 50. Therefore, for the entire memorizer, the illustrated relationship shown in FIGS. 2 and 3 really accomplishes a three-step delay rather than a two-step delay for the continuous voltage signal. Or, in other words, to accomplish a true three-step delay for the continuous signal, a two-step should be effected for the step voltage signal. Voltage waveform 125 of FIG. 3 illustrates the output of the memorizer for the example memory length of three steps.

Figure 4:
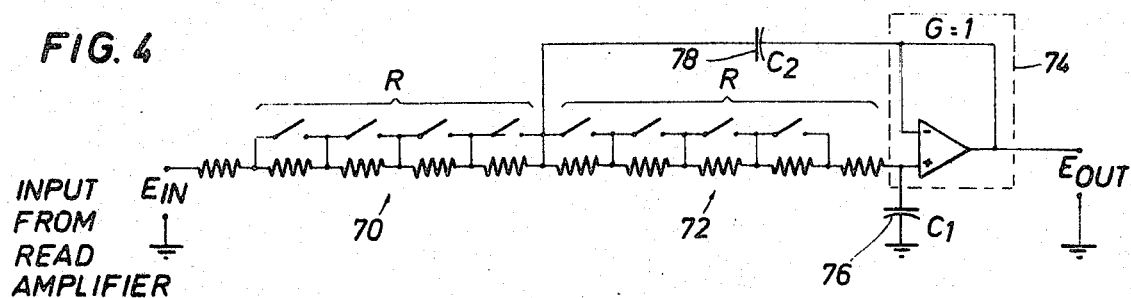
FIG. 4 is a partial block, partial schematic diagram of a spatial filter in accordance with a preferred embodiment of the present invention.

Now referring to FIG. 4, a schematic representation of spatial filter 50 is illustrated. To describe first the topology or geometrical shape of the network, the input from read amplifier 48 is applied to resistor 70, which includes a group of series-connected resistors bypassed by normally open individual switches. Resistor 70 is connected to resistor 72, which in similar fashion includes a group of series-connected resistors bypassed by normally opened individual switches. At least one individual resistor is connected in the circuit for both resistors 70 and 72 even when all of the individual switches are closed to short out the individual resistors they bypass. In the actual circuit, resistors 70 and 72 are identical and the bypass switches are respectively operably joined together so that the operating resistance value of 70 always equals the operating resistance value of resistor 72.

In an actual embodiment of the spatial filter successive component values of the individual resistors comprising resistors 70 and 72 have values of 250K ohms, 500K ohms, 1 megohm, 2 megohms, 4 megohms and so forth, the 250K-ohm resistances being connected even when all of the bypass switches are closed. The positions of the switches determine which of the 16 possible combinations of the four switched series resistances are connected into the circuit as resistance R.

Resistor 72 is connected to the positive terminal of amplifier 74, which may be conveniently set for unity gain. In the illustrated embodiment, amplifier 74 is a high gain operational amplifier connected for unity negative feedback. Capacitor $C_1$, designated with reference numeral 76, is also connected between the same input to amplifier 74 and common. The output of amplifier 74 is connected in a feedback fashion, this connection being connected to the capacitor $C_2$, labeled 78. The return lead of capacitor 78 is connected to the junction between resistors 70 and 72.

If the voltage at the input terminal from the read amplifier is $E_{in}$ and the voltage at the output terminal is $E_{out}$, then it may be shown that in the frequency domain, the ratio of $E_{out}/E_{in}$, or the filter voltage transfer function, is equal to $1/(1+2RC_1S+R^2C_1C_2S^2)$, wherein S is the Laplace operator. As with filter 12, spatial filter 50 exhibits an essentially flat response up to ½T, T being the sampling time interval period. It is well known that such a quadratic polynomial equation may be represented by a pole-zero plot in the S-plane, such as shown in FIG. 5. See, for example, pages 229–230, *Automatic Control System*, Second Edition, Benjamin C. Kuo, Prentice-Hall, Inc., copyright 1967. Further, it is well known that the transient response for a second order feedback control system, such as the one illustrated in FIG. 4, is a damped sinusoidal response if its poles are located on the left-hand side of the S-plane. Therefore, if the values of the components of the circuit shown in FIG. 4 are selected to produce the pole roots such as illustrated in FIG. 5 as "X's," a damped, decreasing sinusoidal response will result. That is, the existence of roots appearing in the left-hand half of the S-plane indicates that a corresponding exponential term in the transient response will decrease monotonically with time to a stable value. The time required for the decay of the transient response is inversely proportional to the horizontal distance from the root to the imaginary $j\omega$ axis. The smaller the distance, the more slowly the transient dies out. For the circuit shown in FIG. 4, it may be demonstrated that the dampening function is equal to the square root of $C_1/C_2$, which is maintained at a constant value. In the S-plane plot of FIG. 5, the pole roots traverse lines of constant dampening. In a practical embodiment of the spatial filter, $C_1$ and $C_2$ have been selected to cause negligible oscillation after six cycles.

The natural frequency of oscillation $\omega_n$ for the damped sinusoidal transient response is determined by the values of R, $C_1$ and $C_2$. The oscillations occur above and below the suddenly imposed input value, such that the output is equal to the input value at the end of each interval T, expressed in seconds. To assure that this subperiod of oscillation is equal to the previously described sampling interval T when the spatial filter is connected to the read amplifier shown in FIGS. 1 and 4, the value of the resistance of R in megohms is discretely selected to be two times T in seconds. The value of the capacitances of $C_1$ and $C_2$ are maintained at constant values in this embodiment.

Figure 6:
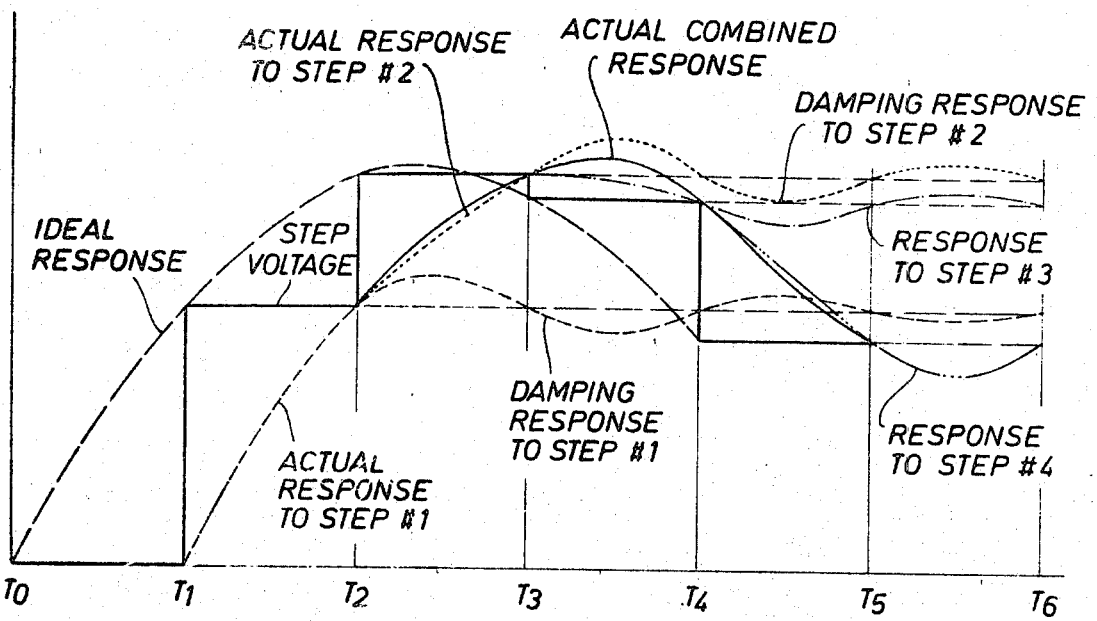
FIG. 6 is a graphical analysis of the operation of the spatial filter shown in FIG. 4 for a few applied dc voltage steps.

Operation of the spatial filter functioning in conjunction with an applied step-voltage is shown in FIG. 6. The step-voltage may be assumed to represent a continuous voltage, and may be the result of the action of the delay switching circuit previously described. Since the purpose of the spatial filter is to reconstruct the continuous voltage represented by the step-voltage, or from which the step-voltage is derived, a so-called "ideal response" curve is shown passing through the values on the step-voltage plot where there is an instantaneous change of voltage values.

The actual response curve is best explained by assuming the operation of the spatial filter circuit during a few discrete time intervals. During the intervals from $T_0$ to $T_1$, the step-voltage is zero and hence there is no response. During the interval from $T_1$ to $T_2$ the response is almost linear, passing through the step-voltage value at time $T_2$. The response for this step 1 continues into the following interval, the overshoot rising and falling to again reach the voltage value for step 1 at time $T_3$. This continues during the subsequent intervals until the response of spatial filter to step 1 is completely damped. Prior to this time, however, at the conclusion of each interval the value is the same as it was for the applied input voltage during step 1.

During the interval from time $T_2$ to $T_3$ the step-voltage input is at a new and higher level. Therefore, the response to this voltage input during the time from $T_2$ to $T_3$ is again nearly linear, reaching the applied voltage value at time $T_3$. It may be noted, however, that the overshoot from step 1 was positive. Therefore, the actual combined response for steps 1 and 2 is shaped to be non-linear and more nearly like the shape of the ideal response curve.

The third step, the interval between $T_3$ and $T_4$, is assumed to have an applied voltage slightly less than the voltage for the previous interval. This being the case, the response for the third step decreases nearly linearly until it reaches a step-voltage value at time $T_4$. Again, the overshoot for the previous step is such that the combined response is shaped to be nearly like the ideal response. Additional responses are illustrated in FIG. 6, the development of the output operating in like manner.

Therefore, the resultant output from the spatial filter is a continuous voltage signal very much like the continuous voltage represented by the step-voltage applied at the input, only delayed by one interval.

When the delay switching circuit shown in FIG. 1 is connected to the spatial filter it may be seen in FIGS. 2 and 3 that a continuous wave input voltage is converted to a step-voltage signal, delayed and effectively reconstructed. As indicated earlier, the spatial filter causes a one-interval delay. Therefore, this delay is taken into account in setting the delay setting of adjustable register 52, as previously discussed.

This invention is particularly adapted for use in the logging of an earth borehole where measurements of the surrounding subsurface earth formations are taken at different depths throughout the borehole by means of one or more measuring devices which are lowered into the borehole at the end of a supporting cable extending from the surface of the earth. Typically, the measurements taken along the length of the borehole are intended to provide indications of oil or gas bearing strata. It is not uncommon for two or more logging means to be included in the same tool, the results having the most comparison meaning when the data pertaining to the same earth formations are aligned with each other in time regardless of the logging velocity. The delay switching circuit and spatial filter just described may be used for accomplishing this alignment.

Figure 7:
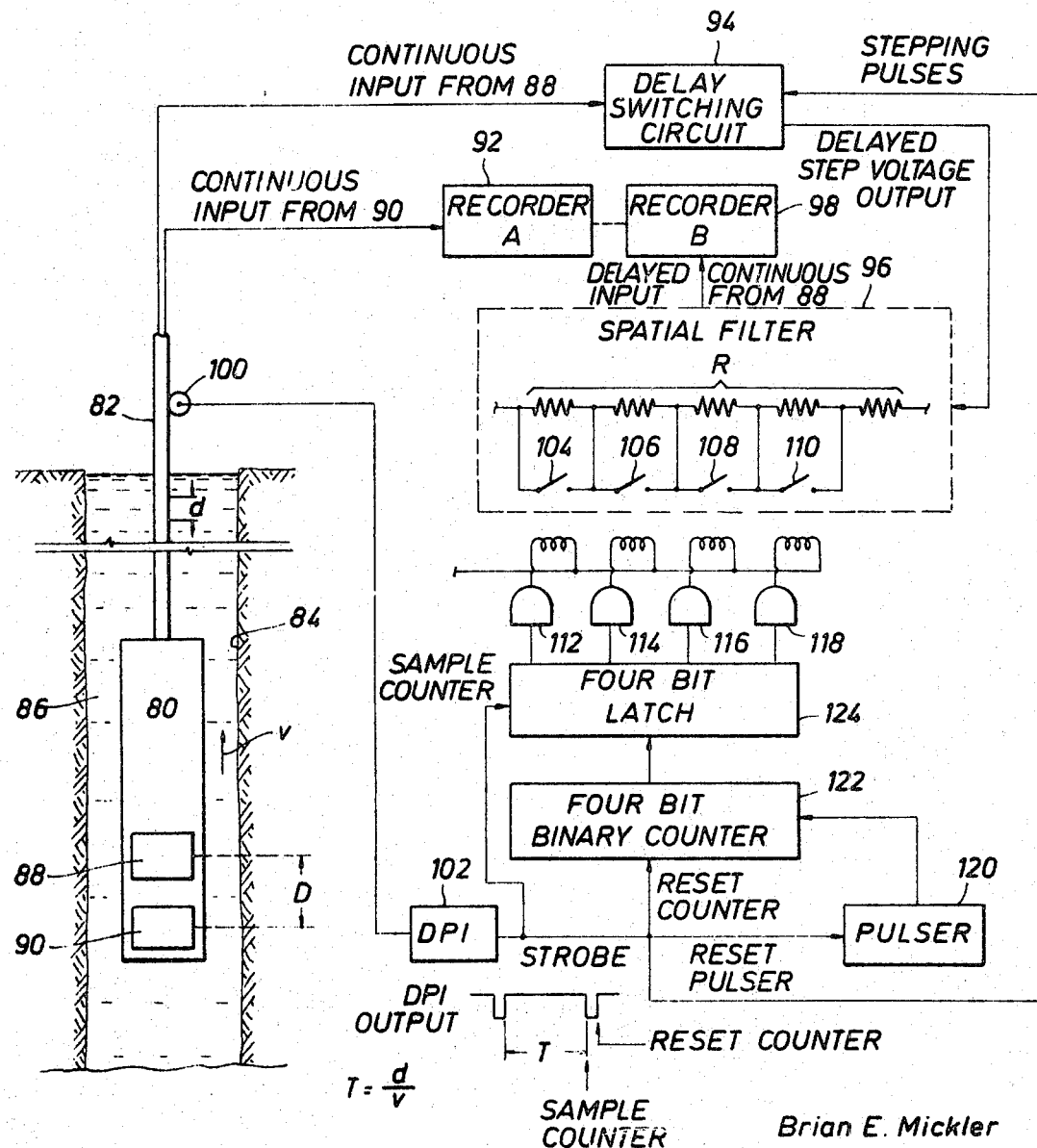
FIG. 7 is a block diagram for the distance-to-time selection network for the circuits shown in FIGS. 1–6 when used in conjunction with a borehole logging tool.

More particular understanding of this application may be had with reference to FIG. 7. A logging tool 80 is supported by an armored electrical cable 82 for passage through a borehole 84, which may be filled with drilling fluid 86. Tool 80 carries at least two logging means 88 and 90. Such logging means may be any desirable means, such as acoustic means, induction means, radiation means or the like.

When logging in a conventional manner, the tool is lowered into the borehole and then moved up hole by a means not illustrated with the supporting cable taut, such movement being as uniform as possible. The problem comes from the fact that, as a practical matter, this movement is rarely uniform. Therefore, means must be provided to automatically sample the signal from logging means 88 and to select the bandwidth $\omega_n$ of the data reconstruction filter so that the data recordings are maintained aligned according to their true depth departure.

The discrete resistance value selection for R of resistors 70 and 72 (their values being identical) for spatial filter 96 (and prefilter 12 when it is also a spatial filter) is via their related bypass switches, or relay contacts, 104, 106, 108 and 110. Operation of the relay contacts are, in turn, controlled by the energization of respective relay coils operatively connected thereto by relay drivers 112, 114, 116 and 118, respectively. These relay drivers are operated by the binary output of the circuit illustrated in FIG. 7 in the manner to be described. For simplicity, the group of individual resistors comprising only one of resistors 70 and 72 is illustrated in FIG. 7.

A wheel 100 rotated by the upward movement of cable 82 causes a strobe pulse to occur from depth pulse intervalometer (DPI) 102 each time a predetermined length $d$ of the cable passes by the wheel. An intervalometer may be defined as a device that produces an output, such as a pulse, each time a fixed distance is travelled by the well-logging tool regardless of how long that time is. Wheel 100, cable 82 and DPI 102 are, therefore, effectively a sensing means producing a varying output in accordance with the time T required for tool 80 to linearly travel a predetermined distance $d$. If memory length N is defined as the number of memory elements, $d$ as the distance interval between memory elements and D as the total distance delay, then N is equal to D divided by $d$. The output occurring from DPI 102 is a short rectangular pulse having a decreasing voltage leading edge and an increasing voltage trailing edge. Time interval T is the time between the trailing edge of one pulse to the leading edge of the following pulse. The stepping pulses from DPI 102 are applied to delay switching circuit 94 to cause operation in the manner described above.

The occurrence of the trailing edge of a DPI strobe pulse also initiates operation of pulser 120, which produces pulses in a preferred embodiment of the invention at 4 pulses per second, the count therefrom being registered on 4-bit binary counter 122. The occurrence of the leading edge of the next DPI strobe pulse causes four bit latch circuit 124 to sample the count in counter 122. The output from the latching circuit operates relay drivers 112, 114, 116 and 118 in the manner previously described. The trailing edge of the strobe pulse then resets the counter and begins anew the production of the pulses from the pulser.

It may be seen that the updating of the latching circuit occurs with each DPI strobe pulse to cause the value of resistance R to be maintained at approximately 2T megohms. The dynamic response characteristics of the spatial filter can therefore change for each successive sampling interval to cause operation thereof to be depth sensitive rather than time sensitive.

It should be recalled that pulser 54 in FIG. 1 was characterized as capable of being a system. When operating in a circuit illustrated in FIG. 7, the output from DPI 102, or a circuit having an operative relationship directly related thereto, is used to achieve effective combined operation by controlling the timing sequence of delay switching control circuit 94 and by controlling the updating of the resistance value in the feedback control loop of spatial filter 96. The operation of the switches in the delay switching circuit are operated at the same sampling interval as the switches for selecting the resistance value in the spatial filter.

Memory length N is established for two logging means carried in the same logging tool by determining the fixed distance between the two means in terms of memory elements. It has been assumed in the above example that three memory elements from pulser 54 in FIG. 1 (or DPI 102 in FIG. 7) constitutes this fixed distance. Whatever the number, it is used to determine a thumbwheel setting on binary coded decimal (BCD) down counter 150, which is connected to pulser 54. BCD down counter 150 is connected to all zero detector 152, the output from which is returned to counter 150 and to resettable register 52.

In operation, the down counter counts down from the set count one at a time until the output therefrom is all zero. All zero detector 152 senses the all zero output from counter 150 and produces an output for resetting both the BCD down counter and resettable register 52 and for operating switches $K_{OR}$ and $K_0$ in the manner previously described.

The above description has assumed that only one channel of data is being processed. Of course, any particular logging system may include duplicate memorizer circuits for processing additional data channels (e.g., when there are more than two logging means carried within the logging tool).

While particular embodiments of the invention have been shown, it will be understood that the invention is not limited thereto, since many modifications may be made and will become apparent to those skilled in the art.

What is claimed is:

1. Apparatus for use in processing well logging signals, comprising:
   input means for receiving a continuous well logging signal which is representative of at least one subsurface characteristic referenced to given borehole depths, means operative as a function of borehole depth changes for storing discrete samples of said well logging signal at given depth intervals for subsequent extraction as delayed discrete samples, and shaping means operative as a function of borehole depth changes for substantially reconstructing said continuous well logging signal from said delayed discrete samples regardless of the time rate of said borehole depth changes.

2. Apparatus for use in processing well logging signals, comprising:

input means for receiving a continuous well logging signal which is representative of at least one sub-surface characteristic referenced to given borehole depths, means for receiving a depth signal representative of the changes in depth to which said well logging signal is referenced, means responsive to said depth signal for storing discrete samples of said well logging signal at given depth intervals for subsequent extraction as delayed discrete samples, and shaping means responsive to said depth signal for substantially reconstructing said continuous well logging signal from said delayed discrete samples regardless of the time rate of change of the depth reference of said well logging signal.

3. Apparatus as described in claim 2 and including means for producing a beginning and ending pulse for each predetermined borehole depth traversal to which said well logging signal is referenced.

4. Apparatus as described in claim 3, wherein said shaping means includes settable time constant means operable in accordance with the spacing of said pulses.

5. Apparatus as described in claim 3, wherein said settable time constant means includes a uniform pulser and a counter for counting pulses therefrom, the cycling period of said counter determined by said beginning and ending pulses.

6. Apparatus as described in claim 5, wherein said shaping means includes:

a unity gain amplifier, first and second series-connected resistors, said second resistor connected to an input terminal of said amplifier said delayed discrete samples being applied to said first resistor and the common terminal of said amplifier, a first capacitor connected to said input terminal and said common terminal of said amplifier, and a second capacitor connected between the output terminal of said amplifier and the junction between said first and second resistors, the values of said first and second resistors being selected by said counter such that said reconstructed signal reaches the level of said delayed discrete samples at the respective succeeding sampling occurrences.

7. Apparatus for use in processing well logging signals, comprising:

input means for receiving a continuous well logging signal which is representative of at least one sub-surface characteristic referenced to given borehole depths, means for receiving a depth signal representative of the changes in depth to which said well logging signal is referenced, a plurality of analog signal storage elements, a plurality of individual and separably operable switching elements electrically connected to each of said storage elements, and means responsive to said depth signal for selectively energizing different ones of said switching elements to cause samples of said continuous well logging signal to be stored on a selected one of said storage elements at selected depth intervals and extracted from each of said storage elements after a selected depth delay to thereby effect a selected depth delay for each such sample of said well logging signal.

8. Apparatus as described in claim 7, and including means for producing pulses, a beginning and ending pulse determining a borehole depth traversal to which said well logging signal is referenced.

9. Apparatus as described in claim 8, and including counting means for counting a predetermined number of said pulses, said counting means operating said switching elements.

10. Apparatus as described in claim 9, and including setting means connected to setting the counting means for establishing a predetermined fixed depth delay operation for said signal storage elements.

11. Apparatus for use in processing well logging signals, comprising:

input means for receiving a continuous well logging signal which is representative of at least one sub-surface characteristic referenced to given borehole depths, means for receiving a depth signal representative of the changes in depth to which said well logging signal is referenced, a plurality of analog signal storage elements, a plurality of individual and separably operable switching elements electrically connected to each of said storage elements, means responsive to said depth signal for selectively energizing different ones of said switching elements to cause samples of said continuous well logging signal to be stored on a selected one of said storage elements at selected depth intervals and extracted from each of said storage elements after a selected depth delay to thereby effect a selected depth delay for each such sample of said well logging signal, and shaping means responsive to said depth signal for substantially reconstructing said continuous well logging signal from said delayed discrete samples regardless of the time rate of change of the depth reference of said well logging signal.

12. Well logging apparatus comprising:

an exploring device supported by a cable for movement through a borehole and adapted to provide a continuous well logging signal representative of at least one sub-surface characteristic, means coupled to said cable for producing a depth signal approximately representative of the changes in depth of said exploring device, delay means responsive to said depth signal for storing discrete samples of said well logging signal at given depth intervals for subsequent extraction as delayed discrete samples, and shaping means responsive to said depth signal for substantially reconstructing said continuous well logging signal from said delayed discrete samples regardless of the time rate of change of the depth reference of said well logging signal regardless of the velocity of said exploring device through a borehole.

13. Apparatus for use in processing well logging signals, comprising:

an exploring device supported by a cable for movement through a borehole and adapted to provide a continuous signal representative of at least one sub-surface characteristic, means coupled to said cable for producing a depth signal approximately representative of the changes in depth of said exploring device, a plurality of analog signal storage elements, a plurality of individual and separably operable switching elements electrically connected to each of said storage elements, and means responsive to said depth signal for selectively energizing different ones of said switching elements to cause samples of a continuous well logging signal to be stored on a selected one of said storage elements at selected depth intervals and extracted from each of said storage elements after a selected depth delay to thereby effect a selected depth delay for each such sample of said well logging signal.

14. Apparatus for use in processing well logging signals, comprising:

input means for receiving a continuous well logging signal which is representative of at least one sub-surface characteristic referenced to given borehole depths, sampling network means for storing a stepped dc voltage for sampling time intervals, said stepped dc voltage being related to the received well logging signal, delay means for extracting the stored stepped dc voltage from said sampling network means at the end of time intervals, and shaping means connected to said delay means for constructing a continuous voltage from the extracted stepped dc voltage, said shaping means causing a continuous voltage representative of said well logging signal established at said stepped dc voltages at the end of each of said respective sampling time intervals.

15. The apparatus as described in claim 14, and including a pulse producing means for determining the sampling time interval, said delay means operable on a predetermined pulse therefrom, said pulse producing means also determining operation of said shaping means to accommodate stepped voltage intervals of varying sampling time duration.

16. The apparatus as described in claim 15, and including borehole depth sensing means connected to said pulse producing means to vary the sampling time interval of the pulses therefrom to be in correlation with the depth sensed.

17. The apparatus as described in claim 16, wherein said borehole depth sensing means includes a register, the number of outputs over a cycling period thereof determining a fixed memory length in terms of discrete steps and the rate of outputs therefrom determining a delay related to time traversal.

18. The apparatus as described in claim 17, and including a settable down counter driven by said depth sensing means, and a count detector driven by said down counter for producing an output upon the production of a predetermined number by said down counter, said count detector resetting said register and said down counter, said down counter being settable to establish said discrete steps of memory length.

19. The apparatus as described in claim 16, wherein said depth sensing means includes an intervalometer.

20. The apparatus as described in claim 14 and including a low-pass prefilter connected to the input of said sampling network means for attenuating frequencies in the input greater than one divided by two times said sampling time interval.

21. The well logging apparatus described in claim 12, wherein said delay means comprises:

a plurality of storage capacitors for storing discrete samples of said well logging signal, a plurality of normally open input memory-step switches, a different one of said input memory-step switches connected to each of said storage capacitors, the input side of said input memory-step switches being joined together in an input receiving write line, a plurality of normally open output memory-step switches, a different one of said output memory-step switches connected to each of said storage capacitors, a succeeding output memory-step switch operably connected with each of said input memory-step switches, the output side of said output memory-step switches being joined together in a read line, a normally closed output switch connected to said read line for producing an output from the memorizer, a common storage capacitor, a normally open read line return switch connected between the output of said output switch and said common storage capacitor, a normally open write line return switch connected between said common storage capacitor and said write line, and counting means responsive to said depth signal for operating said input and output memory-step switches seriatum in discrete steps equal to said given depth intervals, said write line return switch being operated as the first of said input memory-step switches, said output switch and read line return switch being operated at the end of the memory period of said discrete steps.

22. The apparatus as described in claim 21, wherein said input memory-step switches and said output step switches are reed relays.

23. The apparatus as described in claim 22, wherein said counting means includes a register for operating seriatum said input and output memory-step switches, said output switch and said read line and write line return switches.

24. The apparatus as described in claim 23, wherein said counting means further includes a clock pulse generator connected to said register for serially producing output signals therefrom.

25. The apparatus as described in claim 21, wherein said counting means comprises:
   a register for operating said input and output memory-step switches, said write line return switch, said read line return switch and said output switch,
   pulsing means for driving said register,
   a settable down counter driven by said pulsing means, and
   a count detector driven by said down counter for producing an output upon the production of a predetermined number by said down counter, said count detector resetting said register and said down counter,
   said down counter being settable to establish the memory period of said discrete steps.

26. The well logging apparatus described in claim 12, wherein said delay means comprises:
   a plurality of storage elements, the elements receiving and storing discrete samples of said well logging signal, and
   a register for sequentially operating a preselected number of said storage elements for sequentially storing therein said discrete samples of said well logging signal,
   said register subsequently sequentially operating the same preselected number of said storage elements for removing said discrete samples of said well logging signal stored therein,
   the preselected number of said storage elements determining the memory length of said delay means in terms of operating occurrences from said register.

27. The apparatus as described in claim 26, wherein each of said storage elements includes a storage capacitor, an input switch and an output switch, an input switch and an output switch of a subsequent element being operably connected.

28. The well logging apparatus as described in claim 12, wherein said shaping means comprises:
   a unity gain amplifier,
   first and second series-connected resistors, said second resistor connected to an input terminal of said amplifier, discrete samples of said well logging signal being applied to said first resistor and the common terminal of said amplifier,
   a first capacitor connected to said input terminal and said common terminal of said amplifier,
   a second capacitor connected between the output terminal of said amplifier and the junction between said first and second resistors,
   the values of said first and second resistors and said first and second capacitors being selected such that the output voltage reaches the voltage level of each of said discrete samples of said well logging signal after one interval of time and rings about the applied voltage level to return to such level after each subsequent interval of time.

29. The apparatus as described in claim 28, wherein each of said first and second series-connected resistors include a group of individual resistor elements bypassed by individual relay contacts, and further comprising latch selector means operable in response to said depth signals, said depth signals having a spacing corresponding to the interval duration of said discrete samples of said well logging signal, said latch selector means including
   a counter,
   a pulser for receiving said depth signals and driving said counter in response thereto,
   a latch connected to said counter for transferring the count from said counter upon the receipt of a depth pulse from said depth signal producing means, said pulse also returning the contents of said counter to zero,
   a plurality of individual relay drivers,
   said latch having a plurality of outputs, each connected to actuate a separate relay driver, one of said drivers being actuated upon receipt of a transferred count from said counter, said actuated relay driver selecting a pair of resistor values through operation of said individual relay contacts, thereby relating the output of said shaping means to distance.

30. The apparatus as described in claim 29, wherein said first and second resistors are discretely selectable in value in accordance with a change in the time interval from one uniform time duration to another.

31. The apparatus as described in claim 29, wherein the value of each said first and second resistors is selected in megohms to be twice said time interval in seconds.

32. A method for processing well logging signals, comprising;
   receiving a continuous well logging signal which is representative of at least one sub-surface characteristic referenced to given borehole depths,
   storing discrete samples of said well logging signal at selected depth intervals,
   subsequently extracting said stored samples, and
   filtering said extracted stored samples with a time constant which varies with a function of the time rate of change of depth to substantially reconstruct said continuous well logging signal regardless of the time rate of change of depth.

33. A method as described in claim 32, including developing a depth signal representative of the changes in depth to which said well logging signal is referenced, and using said depth signal for controlling said filtering time constant.

34. A method as described in claim 33, wherein said depth signal are pulses, a beginning and ending pulse determining a borehole depth traversal to which said logging signal is referenced.

35. A method as described in claim 34, and including
   creating uniform clock pulses at a rate substantially greater than the occurrence of said depth signal pulses, and
   counting the number of said clock pulses occurring between depth signal pulses, said count being used for controlling said filtering time constant.

36. A method for memorizing and later reconstructing a continuous well logging signal comprising the steps of;

receiving a continuous well logging signal which is representative of at least one sub-surface characteristic referenced to given borehole depths, storing discrete dc voltages related to discrete samples of said well logging signal at sampling time occurrences, sequentially extracting said stored dc voltages at subsequent sampling time occurrences, and creating a continuous wave voltage from the extracted dc voltages shaped to simulate said applied continuous well logging signal by causing a continuous wave voltage which is established at the preceding extracted dc voltage level at each sampling time occurrence.

37. A method as described in claim 36, wherein the time for sequentially extracting said stored DC voltage occurs at a predetermined number of time occurrences following said storing that is related to a fixed memory length, the rate of time occurrences determining a delay related to time traversal.

38. A method as described in claim 36, and including the step of varying the number of sampling time occurrences between storing and extracting.

39. A method as described in claim 36, the extracted dc voltages occurring at least over a predetermined period of time at uniform intervals, wherein the step of creating a continuous wave voltage includes selecting the resistor values of a feedback control network including resistors and capacitors and a regenerative amplifier to have a time constant that gradually allows the extracted dc voltage to obtain a level of the extracted dc voltage after one interval of time, and selecting capacitor and resistor values for said network such that the pole-zero plot of the S-plane in the frequency domain for said network reveals pole roots traversing lines of constant dampening within the left-hand quadrants of the plot, said network sampling each extracted dc voltage such that after each subsequent sampling time occurrence the output voltage for said extracted dc voltage is at said extracted dc voltage.

40. A method as described in claim 39, and including the step of selecting the sampling occurrences and said resistor values to create a reconstructed continuous wave signal related to distance travelled when said number of intervals occurring over a period of time is proportional to distance travelled during that period.

41. A method for memorizing and later reconstructing a continuous well logging signal comprising the steps of;

receiving a continuous well logging signal which is representative of at least one sub-surface characteristic referenced to given borehole depths, separately storing said continuous well logging signal as a stepped dc voltage at sampling time intervals, successively extracting said stored dc voltage at a predetermined number of sampling time intervals later than the sampling time intervals of separately stored dc voltage, varying the length of the sampling time intervals by varying the distance between sampling time occurrences in accordance with a time-independent variable, and creating a continuous wave voltage from the extracted dc voltages shaped to simulate said applied continuous well logging signal by establishing a continuous wave at the extracted dc voltage level at the end of each sampling time interval regardless of the varying distance between sampling time occurrences.

42. A method as described in claim 41, wherein the time-independent variable is distance, including the steps of sensing the distance over a prolonged period of time, and varying the sampling time interval in accordance with the time required to travel a predetermined distance.

43. A method for simulating a continuous voltage from a series of discrete samples of a well logging signal each of said discrete samples of the well logging signal occurring at least over a predetermined period of time at uniform intervals, comprising the steps of;

selecting the resistor values of a feedback control network including resistors and capacitors and a regenerative amplifier to have a time constant that gradually allows the voltage of the discrete samples of the well logging signal to obtain a level of the voltage of the discrete samples of the well logging signal after one interval of time, and selecting capacitor values for said network such that the pole-zero plot of the S-plane in the frequency domain for said network reveals pole roots within the left-hand quadrants of the plot, said network dampening an applied voltage levels of the discrete sample such that after each subsequent interval the output voltage level is at the voltage level of the applied discrete sample of the well logging signal.

* * * * *